A. D. BARTH.
AUTOMATIC FENDER AND BRAKE FOR AUTOMOBILES.
APPLICATION FILED JULY 27, 1911.

1,051,379.

Patented Jan. 28, 1913.

4 SHEETS—SHEET 1.

WITNESSES:-
Joseph McFadden
Mollie Silver

INVENTOR
Albert D Barth
Henry John N'Sen
ATTORNEY.

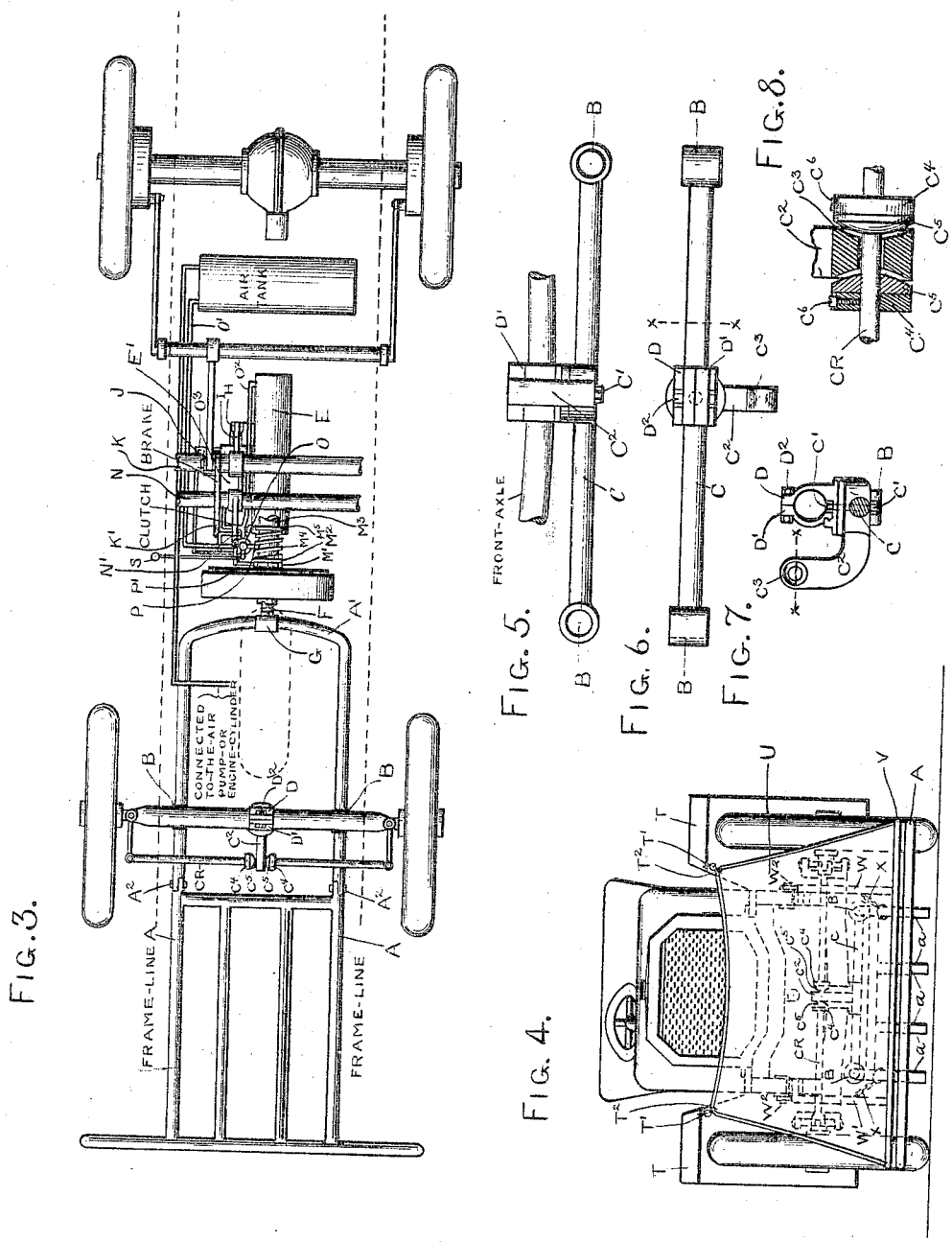

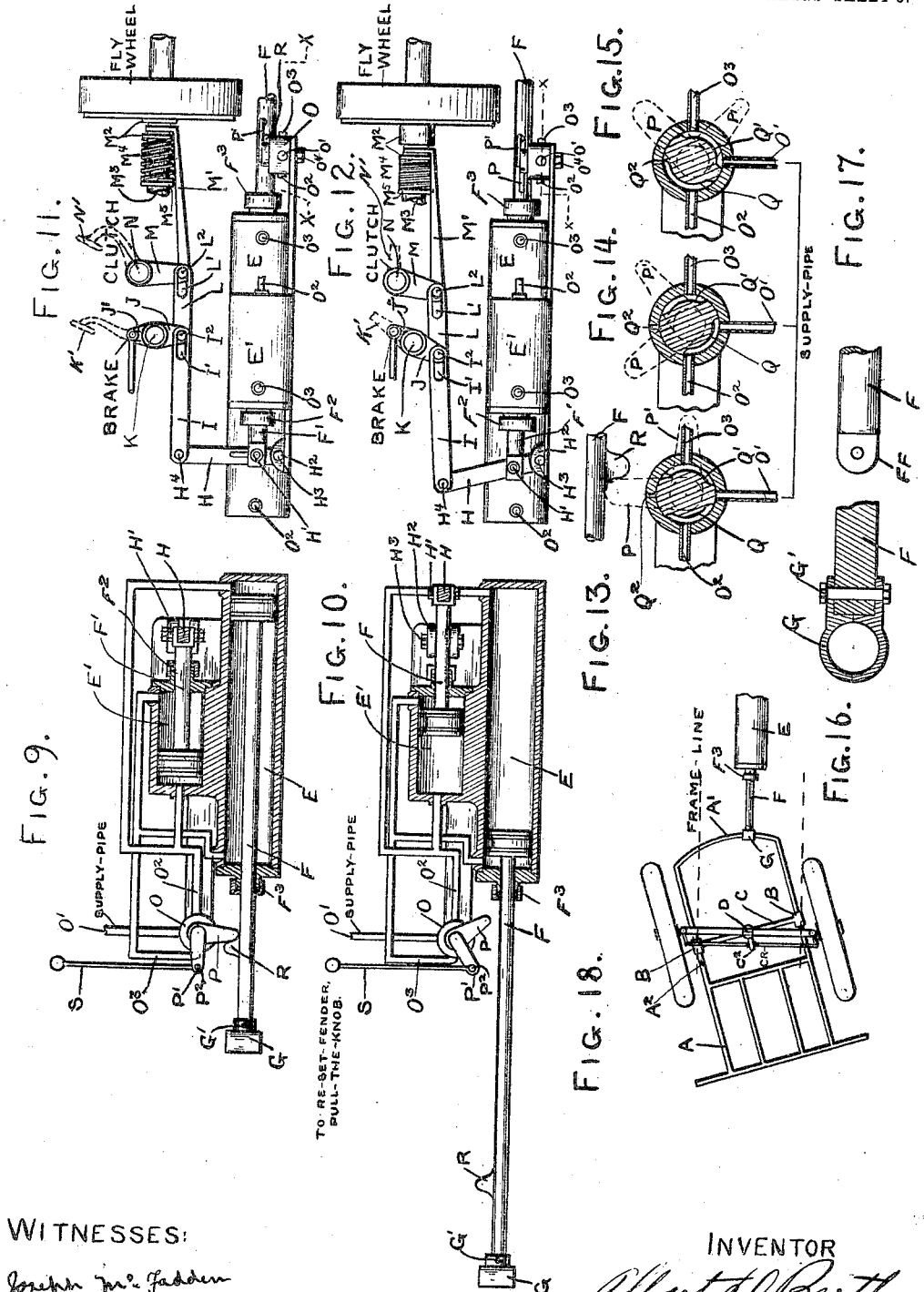

A. D. BARTH.
AUTOMATIC FENDER AND BRAKE FOR AUTOMOBILES.
APPLICATION FILED JULY 27, 1911.

1,051,379.

Patented Jan. 28, 1913.
4 SHEETS—SHEET 4.

WITNESSES:
Joseph McFadden
Mollie Silver

INVENTOR
Albert D Barth
Henry John Nilson
ATTORNEY.

UNITED STATES PATENT OFFICE.

ALBERT D. BARTH, OF PHILADELPHIA, PENNSYLVANIA.

AUTOMATIC FENDER AND BRAKE FOR AUTOMOBILES.

1,051,379.   Specification of Letters Patent.   Patented Jan. 28, 1913.

Application filed July 27, 1911. Serial No. 640,896.

*To all whom it may concern:*

Be it known that I, ALBERT D. BARTH, a citizen of the United States, residing at Philadelphia, in the county of Philadelphia and State of Pennsylvania, have invented certain new and useful Improvements in Automatic Fenders and Brakes for Automobiles, of which the following is a specification.

My invention pertains to an automatic fender and brake for automobiles and has for its object to provide a safety device for attaching to automobiles and other power-driven vehicles, first, to automatically operate upon striking a person, second, to operate quicker than the speed of the automobile, and third, coincident with the operation of the fender, to release the clutch from the engine or motor and to automatically apply the brakes, thereby causing the vehicle to stop. And in order that the invention may be thoroughly understood as to construction and operation, reference will be made to the accompanying drawings, wherein like letters denote like parts.

Figure 1:
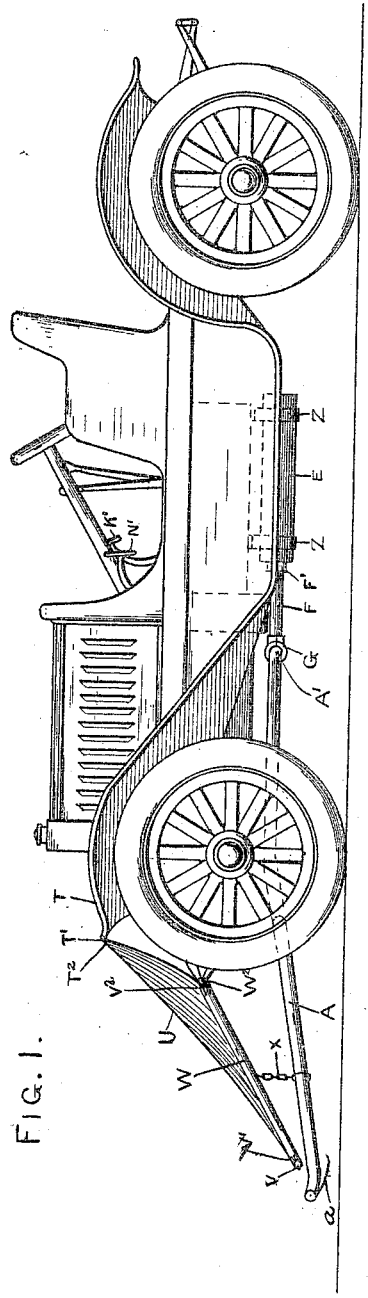
Figure 2:
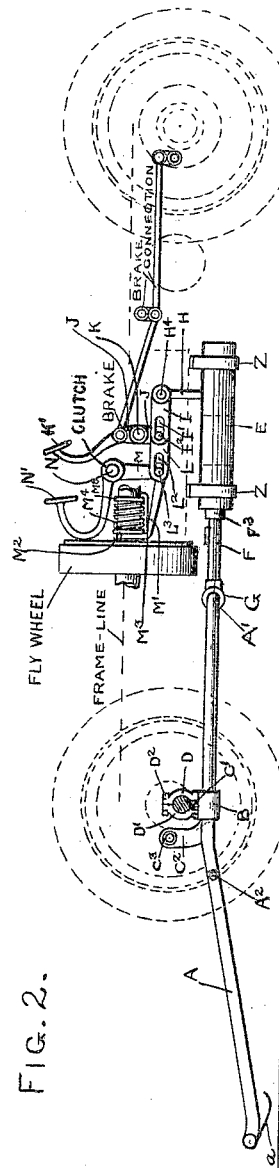
Figure 19:
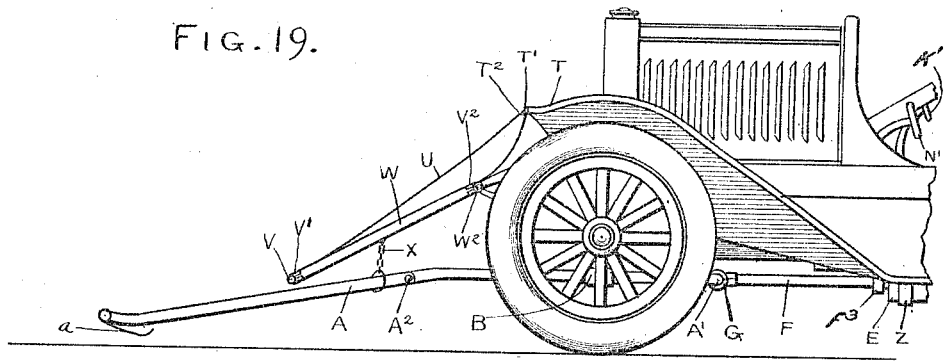
Figure 20:
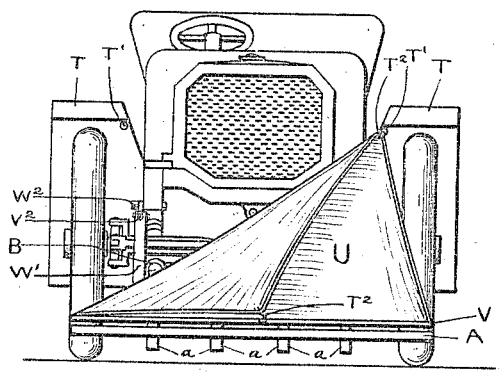
Figure 21:
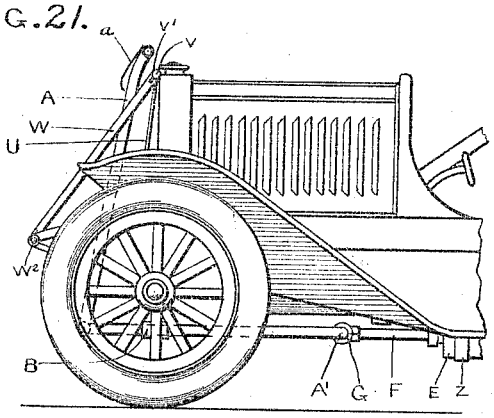
Figure 22:
Figure 23:
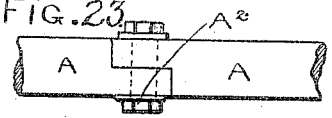
Figure 24:
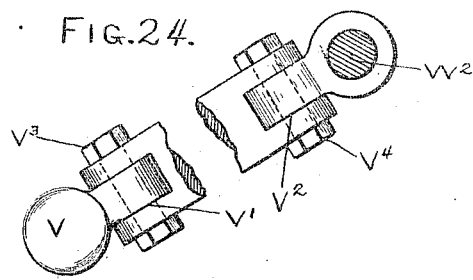
Figure 25:
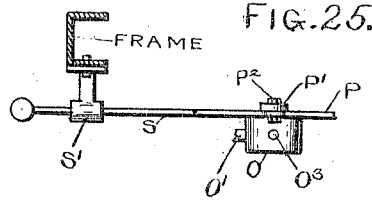
Figure 26:
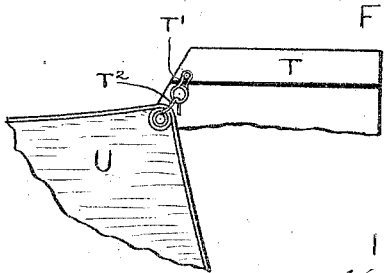

Therefore, Figure 1 is a side elevation of an automobile equipped with my fender. Fig. 2, a side elevation of my invention with part of the automobile in dotted lines. Fig. 3, a top plan of my fender showing the arrangements of parts to operate the same. Fig. 4, a front elevation of an automobile with my fender attached and shown in solid and dotted lines. Fig. 5, a front elevation of the saddle, which supports the fender, pivotally mounted to a clamp secured to the front axle. Fig. 6, a top plan of the saddle, showing the projecting arm which is engaged by the rod connecting the two front wheels of an automobile. Fig. 7, a cross section on the line X X of Fig. 6, showing in side elevation the arm projecting from the saddle, and also the construction of and method of securing the clamp to the front axle. Fig. 8, a cross section on the line X X of Fig. 7, showing how the connecting rod of the front wheels of an automobile are held engaged with the arm projecting from the saddle. Fig. 9, a transverse cross section through the operating mechanism, when the mechanism is in its normal position. Fig. 10, a transverse cross section through the operating mechanism, when the mechanism is in a position after operating. Fig. 11, a side elevation of the operating mechanism, when the mechanism is in its normal position, with the complete attachments for also operating the clutch and applying the brake. Fig. 12, a side elevation of the operating mechanism, when the mechanism is in a position after operating, with the complete attachments operating the clutch and applying the brake. Fig. 13, a cross section on the line X X of Fig. 11, of the valve in a position prior to operation by a backward movement of the fender. Fig. 14, a cross section on the line X X of Fig. 12, of the valve after operation by the backward movement of the fender. Fig. 15, a cross section of the valve after being moved by hand in order to establish the normal relation of the mechanical parts shown in Figs. 2—3—9 and 11. Fig. 16, a vertical cross section of the clamp attaching the fender to the operating mechanism. Fig. 17, the active end or piston rod of the operating mechanism which is engaged by the clamp attached to the fender. Fig. 18, a top plan view showing how the wheels of the automobile, moved to guide the vehicle, likewise move the saddle, Figs. 2—3—5—6, so that the fender also is moved in the same direction. Fig. 19 is a side elevation of the front part of an automobile equipped with my fender and illustrates the fender projected beyond its normal position. Fig. 20 is a front elevation of an automobile equipped with my fender and illustrates one side of the secondary part of my fender, detached. Fig. 21 is a side elevation of the front part of an automobile equipped with my fender and illustrates the fender lifted and thrown back. Figs. 22 and 23 illustrate a detail of the frame of the fender. Fig. 24 illustrates a detail of the frame of the secondary part of the fender. Fig. 25 illustrates a detail relating to the mechanism for operating the fender. Fig. 26 illustrates a detail relating to the secondary part of the fender.

In my invention are two main parts:— the primary or active, and the secondary or inactive, both with their respective details of construction.

The secondary comprises a pocket U of canvas or other suitable material, removably engaged at its upper ends by hooks T² to a ring T' attached to both mud guards T, T, of an automobile, as in Figs. 1—4—19—20 and the enlarged detail view 26. The lower end of this flexible pocket U is securely attached to a cross bar V, as in Figs. 1—4—19 and 20. This bar V engages parallel bars W and W', as shown in dotted lines in Fig. 4, by hinge joints V' as in Figs. 1, 19, and the enlarged detail view 24, wherein a bolt V³ passing from side to side of W or W' through projections on V, constitutes the hinge. The upper ends of W and W' are hinged V² as in Figs. 1, 19 and 20, to an eye ring W³ as in Fig. 24, wherein the hinge V² consists of a bolt V⁴ passing from side to side of W or W' through a lug integral with eye ring W³. The eye rings W³ are engaged by bolts W² as in Figs. 1—4—19—20 and 24. The bolts W² are the bolts employed to attach the forward ends of the leaf springs of an automobile, to the forward ends of the frame. And all for the purpose to be hereinafter described and set forth.

The primary or active part consists of a frame slidably attached to the piston of a cylinder and another cylinder with piston attached to mechanism for disengaging the clutch of the engine or motor and also to apply the brakes;—both pistons rendered active by fluid pressure created and stored by the engine or motor.

In the primary or active part, a frame A, of the design illustrated, is slidably mounted in the sleeves B, B, Figs. 2—5—6 and 18. The sleeves B, B, are of the saddle C, Figs. 5—6 and 18, and the saddle is enlarged equidistant from the sleeves B, B, to form a table to correspond to the lower part of the clamp D, Figs. 5 and 6. The clamp D is in two parts, D being the main part and D' the removable part, the construction being shown in Fig. 7. This clamp D engages the front axle by means of the bolt D² passing through and holding D' to D, as in Figs. 2—3—6 and 7. A bolt C' passes from the under side of saddle C to within and between the lower part of D and D' as in Fig. 7. The bolt C' is the pivot upon which the saddle C turns. An arm C² projects from the saddle C and the end is pierced, both sides of the aperture being concaved C³, as in Figs. 5—6—7 and 8, to pass a rod C R, connecting the front or guiding wheels of an automobile, and upon this rod C R are disposed two convex washers C⁵ C⁵ corresponding to the concave faces C³ C³ of the aperture in C² and holding these washers in place are two sleeves C⁴ C⁴ with set screws C⁶ C⁶ as in Fig. 8. The frame A is hinged as at A², Figs. 2—3—18—19—22 and 23;—the hinge is formed by overlapping the metal as in Fig. 23, with the ends partly vertical meeting a vertical seat as at A³ Fig. 22; the bolt A², Figs. 22 and 23, constituting the hinges. The rear end of frame A is curved, Figs. 3 and 18 to correspond to the arc scribed when the frame is turned to right or left in the saddle C.

The cylinders are secured to the under side of the transmission case by straps Z Z, as in Figs. 1—2—19 and 21. Both cylinders, E and E', Figs. 3—9 and 10, have pistons F and F' with packing gaskets F² and F³. Piston F has a T-shaped split coupling G, for engaging the curved end A' of the frame A, as in Figs. 3—9—10 and 18. This coupling G is held to piston F by a bolt G', Fig. 16, and the end of piston F is curved as at F F, Fig. 17, to permit a slight movement to either side of coupling G when frame A is moved sidewise. Piston F', as in Figs. 11 and 12, is connected by bolt H' to an arm H which is secured by a bolt H³ to an offset H² integral with the casting of the cylinder E'. The upper end of arm H, Figs. 11 and 12, is connected by bolt H⁴ to a bar I, the opposite end of which has an eye I' engaged by bolt I² to an arm J secured to cross bar K, and to this cross bar K, is secured the pedal K', Figs. 2 and 3, used to apply the brakes, the connection for the same being indicated at J', Figs. 2—3—11 and 12. Attached by the bolt I², Figs. 2—11 and 12, is a bar L having an eye L' engaged by a bolt L² secured to the arm M to the cross bar N. And it is to this cross bar N, Figs. 2—3—11 and 12, to which is secured the pedal N' used to throw in or disengage the clutch.

From the foregoing it is shown that by reason of the eye L' in bar L that the clutch pedal may be moved forward to disengage the clutch, without interfering with the mechanism arranged to piston F', and also that the brake pedal, by reason of the eye I' in bar I may be moved forward to apply the brakes without interfering with the mechanism attached to piston F'.

In Figs. 3—9—10—11 and 12, O is a valve secured by a bolt O⁴ to an offset integral with the cylinders. Secured to the valve are two arms P and P', Figs. 9 and 10. The arm P is back of and in alinement with the offset R on the piston F, Fig. 9. The other arm, P', is engaged by a bolt P² to a rod S movable in a hanger S' secured to the frame of the motor car, as in Fig. 25. The valve O has four openings: O', which also is the supply pipe from the air tank, as in Figs. 3—9— and 10—O², which also is the pipe to back of pistons F and F' in cylinders E and E'—O³, which also is the pipe to the front or rod side of pistons F and F' in the cylinders E and E', all as in Figs. 9 and 10,—Q², a vent for the by-passes Q and Q', Figs. 13—14 and 15.

The air tank, Fig. 3, is charged with air by a pump operated by the engine or motor, or by suitable automatic connection to one or several cylinders of the engine to become charged by the gases exploding therein.

In Figs. 1—4 and 19, X X are either light chains or straps connecting W and W' to frame A, to move the pocket U as the frame A is moved when the automobile is steered.

Certain details having been described, the operation of the fender with clutch release and brake application, is as follows:—the automobile is moving forward, and all parts of the fender and fender-operating mechanism are in their normal position as shown in Figs. 1—2—3—9—11 and 13, and assuming that a pedestrian is struck:—the forward end of frame A upon striking, will bend downward and be caught by the springs a a a, Figs. 1—2—4—19 and 20, which, sliding upon the surface of the road, will eliminate the road as a possible immovable obstruction to the frame coincident to this movement, there likewise occurs a backward movement of the frame A, owing to the obstruction, thereby imparting a slight backward movement of piston F, until the offset R, Fig. 9, has moved the arm P of the valve O, Fig. 10, backward and turning valve O brings the by-pass Q, Fig. 14, to connect supply pipe O' to O², thereby permitting the air to pass from the air tank to back of pistons F and F', forcing F quickly forward and also frame A, as in Figs. 10—12 and 19, and at the same time forcing piston F' backward, Figs. 10 and 12, and through the medium of H—I—I²—L and L², pull a fork M' engaging a sleeve M², of the clutch, against the spring M⁴ held upon the shaft M³ by the fixed sleeve M⁵, thereby disengaging the clutch, and the same movement transmitted through J upon K to J' applies the brakes, causing the car to stop.

Assuming the person to have been upset and thrown backward into pocket U, by reason of the quick motion forward of the frame A, the driver of the automobile resets the mechanism by pulling upon the rod S attached to arm P' by bolt P², until the by-pass Q' connects the supply pipe O', Fig. 15, to O³, which connects by pipe line, Figs. 9 and 10, to the front or rod side of the pistons F and F', and the air from the air tank entering the cylinders E and E' causes the said pistons to return to their normal position, as in Fig. 9:—the small vent Q² assures a gradual return of the pistons, since upon moving the valve by rod S, brings the by-pass Q, Fig. 15, to connect O² with the vent Q², permitting the air to escape from the operating side of the cylinders.

When in the garage or parked the frame A, and pocket U, upon W and W' are lifted up and back, as shown in Fig. 21. And when it is necessary to crank the engine, either upper end of pocket U is easily unhooked and dropped, as shown in Fig. 20.

Modifications can be made in design and construction and location of one or all features of the invention, such as will be necessary to adapt the fender and operating mechanism to cars of different makes, without departing from the spirit of the invention, and I therefore do not wish to be limited to the exact construction shown.

Having fully described my invention what I claim as new and desire to secure by Letters Patent is:

1. In an automatic fender—including a clutch-disengaging and brake-applying construction for automobiles—a tank charged with fluid pressure by the engine or motor—said tank connected to a valve—the valve connected to each end of two cylinders disposed beneath the transmission case—pistons in said cylinders—one piston engaging an arm between its fixed and movable ends—the movable end connected to a bar engaging an arm upon the brake pedal shaft, another bar therefrom to an arm upon the clutch pedal shaft—eyes in the two bars at points of engagement upon the aforementioned arms—a connection from the clutch pedal shaft to the clutch:—the other piston connected by a sleeve to a frame—the frame slidable in a saddle swung upon a clamp secured to the front axle—an offset upon said piston to engage an arm integral with the valve to which motion is imparted by a backward movement of the frame—a by-pass in said valve whereby upon rearward movement of the frame fluid pressure is allowed to enter said cylinders—effecting the pistons therein to disengage the clutch—apply the brakes and rapidly project said frame—in combination with a flexible frame attached to the automobile frame above the operating frame—said flexible frame connected to the under frame—a pocket of pliable material attached to the flexible frame and guards of the automobile—all substantially as and for the purpose described and set forth.

2. In an automatic fender—including a clutch - disengaging and brake - applying mechanism for automobiles—a tank automatically kept charged with fluid pressure by the engine—two cylinders connected with the tank—a valve disposed between the connections—by-passes in the valve—two arms integral with the valve—pistons in said cylinders—pin and slot connections from one piston to brake pedal shaft and clutch pedal shaft arranged so as not to interfere with the manual operation of said brake pedal shaft and clutch pedal shaft—an offset upon the other piston adjacent to one of the arms of said valve—a sleeve upon the end of the piston engaging a frame movable in a saddle swung upon a clamp secured to the front axle—said frame upon being moved backward causes the offset upon the piston to impinge an arm of the valve—turning said valve to aline one by-pass to transmit pressure through pipe from the tank to the cylinders—effecting movement to pistons in said cylinders to coincidently disengage the clutch—apply the brakes and project the frame—in combination with a frame hinged at upper end and lower cross bar—the upper end attached to the frame of the automobile—a pocket of pliable material attached to said frame and guards of the automobile—a flexible connection between this upper frame and the lower frame—all substantially as and for the purpose described and set forth.

3. In an automatic fender—including a clutch-disengaging and brake-applying mechanism for automobiles:—a frame movable in a saddle swung upon a clamp secured to the front axle—springs upon the under side of the forward end of the frame—hinge joints between the forward end of frame and said saddle—the rear end of frame curved to correspond with the arc of its lateral movement—the piston of a cylinder connected to a sleeve engaging the rear end of said frame—an adjoining cylinder with the piston connected to a rocker arm arranged with link bars connecting the brake pedal shaft and clutch pedal shaft—a connection from clutch pedal shaft to clutch—a valve connected to both ends of said cylinders—by-passes and a vent in said valve—two arms integral with the valve—one arm for engagement by an offset upon the piston connected to the frame—a pipe connection from the valve to a tank automatically kept charged with fluid pressure by the engine—the fluid pressure entering said cylinders—moving the pistons therein to impart movement to rocker arm and the link bars to disengage clutch—apply the brakes and project the aforementioned frame—after said frame has been moved backward with consequent turning of the valve by impingement of the offset on the piston on the aforementioned arm of the valve and alining one by-pass to transmit the fluid pressure by pipe to said cylinders—a rod connected to the other arm of the valve to reverse the valve and direction of fluid pressure through pipe to cylinders to re-arrange the pistons with frame—clutch-disengaging and brake-applying mechanism—said reversal alining the first by-pass and pipe connections to a vent to allow escape of fluid pressure in cylinders used to effect first stated operation—in combination with an auxiliary frame attached to the frame of the automobile—disposed above the operating frame—said auxiliary hinged at top and bottom—a flexible pocket attached to said frame—the pocket removable from attachment with upper supports—a connection between said frames to move the upper frame coincident with the lateral movement of the lower frame—both frames free to be lifted and folded back—all substantially as and for the purpose described and set forth.

In testimony whereof I have affixed my signature in presence of two witnesses.

ALBERT D. BARTH.

Witnesses:
 OSWALD CHEW,
 MOLLIE SILVER.

Copies of this patent may be obtained for five cents each, by addressing the "Commissioner of Patents, Washington, D. C."